United States Patent
Magori et al.

(10) Patent No.: US 11,131,030 B2
(45) Date of Patent: Sep. 28, 2021

(54) ELECTROLYSIS CELL OR ELECTRODE PLATE WITH A GAS DIFFUSION ELECTRODE

(71) Applicant: Siemens Aktiengesellschaft, München (DE)

(72) Inventors: Erhard Magori, Feldkirchen (DE); Kerstin Wiesner-Fleischer, Höhenkirchen-Siegertsbrunn (DE); Philippe Jeanty, Munich (DE); Oliver von Sicard, Munich (DE); Angelika Tawil, Munich (DE); Van An Du, Hamburg (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 71 days.

(21) Appl. No.: 16/465,068

(22) PCT Filed: Nov. 20, 2017

(86) PCT No.: PCT/EP2017/079761
§ 371 (c)(1),
(2) Date: May 29, 2019

(87) PCT Pub. No.: WO2018/104038
PCT Pub. Date: Jun. 14, 2018

(65) Prior Publication Data
US 2019/0292669 A1  Sep. 26, 2019

(30) Foreign Application Priority Data
Dec. 8, 2016  (DE) .................... 10 2016 224 466.3

(51) Int. Cl.
*C25B 11/031*  (2021.01)
*C25B 1/04*  (2021.01)
(Continued)

(52) U.S. Cl.
CPC .............. *C25B 11/031* (2021.01); *C25B 1/00* (2013.01); *C25B 1/04* (2013.01); *C25B 9/17* (2021.01);
(Continued)

(58) Field of Classification Search
CPC ....... C25B 11/032; C25B 11/031; C25B 9/75; C25B 9/17; C25B 11/036; C25B 1/00; C25B 1/04; C25B 15/02; Y02E 60/36
See application file for complete search history.

(56) References Cited

U.S. PATENT DOCUMENTS

| 5,104,497 A | 4/1992 | Tetzlaff et al. ................ 205/413 |
| 6,251,239 B1 | 6/2001 | Gestermann et al. ........ 204/265 |

(Continued)

FOREIGN PATENT DOCUMENTS

| CN | 1238014 A | 12/1999 | ............. C25B 11/03 |
| CN | 1275175 A | 11/2000 | ............... C25B 1/46 |

(Continued)

OTHER PUBLICATIONS

Ruge, "Entwicklung eines flüssigkeitsgekühlten Polymer-Elektrolyt-Membran-Brennstoffzellenstapels mit einer Leistung von 6,5 kW", ETH Zürich Research Collection, Doctoral Thesis, 147 pages (German Language w/ English Abstract), 2003.

(Continued)

*Primary Examiner* — Ciel P Contreras
(74) *Attorney, Agent, or Firm* — Slayden Grubert Beard PLLC (57) ABSTRACT

Various embodiments include an electrolysis cell with a housing with an anode and a gas diffusion electrode connected as cathode. The gas diffusion electrode has an electrolyte side and a gas side and separates the electrolyte space from a gas space for a reaction gas. There is a support body disposed in the gas space with a contact surface in contact (Continued)

with the gas diffusion electrode. The gas space comprises a first channel system and a second channel system. The first channel system and the second channel system run separately from one another and thus form two separate volumes of the gas space. The first channel system and the second channel system each have openings in the contact surface of the support body.

10 Claims, 4 Drawing Sheets

(51) Int. Cl.
*C25B 15/02* (2021.01)
*C25B 1/00* (2021.01)
*C25B 9/17* (2021.01)
*C25B 9/75* (2021.01)
*C25B 11/036* (2021.01)
*C25B 11/032* (2021.01)

(52) U.S. Cl.
CPC .............. *C25B 9/75* (2021.01); *C25B 11/032* (2021.01); *C25B 11/036* (2021.01); *C25B 15/02* (2013.01); *Y02E 60/36* (2013.01)

(56) References Cited

U.S. PATENT DOCUMENTS

| | | | |
|---|---|---|---|
| 6,368,473 B1 | 4/2002 | Furuya et al. | 204/263 |
| 7,718,298 B2 | 5/2010 | Tighe et al. | 429/513 |
| 7,838,139 B2 | 11/2010 | Turpin et al. | 429/417 |
| 8,268,506 B2 | 9/2012 | Dietrich et al. | 429/514 |
| 9,023,549 B2 | 5/2015 | Shimamune et al. | 429/474 |
| 9,966,613 B2 | 5/2018 | Olsommer | |
| 2007/0105000 A1* | 5/2007 | Chapman | H01M 8/0258 429/430 |
| 2008/0241635 A1* | 10/2008 | Sato | H01M 8/04186 429/404 |
| 2010/0314261 A1* | 12/2010 | Perry | C25B 1/26 205/618 |
| 2014/0034511 A1 | 2/2014 | Cordes et al. | 205/630 |
| 2014/0124380 A1 | 5/2014 | Fan | 205/350 |
| 2016/0017503 A1* | 1/2016 | Kaczur | C25B 3/04 205/346 |
| 2016/0164120 A1 | 6/2016 | Swiegers et al. | 429/446 |

FOREIGN PATENT DOCUMENTS

| | | | |
|---|---|---|---|
| CN | 1663067 A | 8/2005 | C25B 13/02 |
| CN | 101126162 A | 2/2008 | C25B 1/08 |
| CN | 101267042 A | 9/2008 | H01M 4/86 |
| CN | 101807679 A | 8/2010 | H01M 2/18 |
| CN | 103299463 A | 9/2013 | C25B 11/03 |
| CN | 104813527 A | 7/2015 | H01M 8/02 |
| CN | 105316700 A | 2/2016 | C25B 11/03 |
| DE | 199 54 247 A1 | 5/2000 | C25B 15/08 |
| DE | 10 2009 016 635 A1 | 10/2010 | C25B 13/00 |
| DE | 10 2011 007 759 A1 | 10/2012 | C25B 9/00 |
| EP | 0 150 017 A1 | 7/1985 | C25B 11/03 |
| EP | 2 730 638 A1 | 5/2014 | C01B 3/42 |
| WO | 2015/013764 A1 | 2/2015 | C25B 11/04 |
| WO | 2018/104038 A1 | 6/2018 | C25B 1/00 |
| WO | WO 2018/104038 A1 | 6/2018 | |

OTHER PUBLICATIONS

German Office Action, Application No. 10 2016 224 466.3, 9 pages, dated Aug. 23, 2017.
International Search Report and Written Opinion, Application No. PCT/EP2017/079761, 15 pages, dated Mar. 26, 2018.
Petrov, K. et al., "Electrolytic Cell for Hydrogen and Sulfuric Acid Production," Bulgarian Chemical Communications, vol. 43, No. 1, p. 105-110, Oct. 15, 2010.
Zhao, Chenchen et al., "Progress of Cathode Materials for Electrochemical Reduction of Carbon Dioxide," Chemical Industry and Engineering Progress, pp. 373-380, Sep. 10, 2012.
Chinese Office Action, Application No. 201780075843.X, 10 pages, dated Sep. 27, 2020.

* cited by examiner

ELECTROLYSIS CELL OR ELECTRODE PLATE WITH A GAS DIFFUSION ELECTRODE

CROSS-REFERENCE TO RELATED APPLICATIONS

This application is a U.S. National Stage Application of International Application No. PCT/EP2017/079761 filed Nov. 20, 2017, which designates the United States of America, and claims priority to DE Application No. 10 2016 224 466.3 filed Dec. 8, 2016, the contents of which are hereby incorporated by reference in their entirety.

TECHNICAL FIELD

The present disclosure relates to electrolysis. Various embodiments may include an electrolysis cell.

BACKGROUND

Electrolysis cells having electrode plates and methods for the operation thereof are generally known. Gas diffusion electrodes (GDE) are used, for example, in fuel cells for generating energy from hydrogen and oxygen. Another use of GDEs is in electrochemical cells for the reaction of reaction gases. In such electrochemical cells, a feed gas (reaction gas) is introduced and a product gas, which can also be a gas mixture, is discharged. The GDE here forms the cathode which is gas-permeable (microporous structure). The electrolyte space between anode and cathode is filled with an electrolyte and can additionally have a separating membrane, for example a membrane made of NAFION®. In this case, the electrolyte is fed separately to the two sub-spaces.

The GDE allows diffusion of the reaction gas. For the gas to be able to penetrate into the cathode, the concentration gradient which is established by the continual reaction of the gas in the interior of the GDE is exploited. A further possibility is to increase the gas pressure on the gas side of the GDE, as a result of which the conversion of gas in the GDE increases. The reaction gas is reacted in the GDE. This can form a product gas which, depending on the pressure prevailing on the gas side, passes through the GDE and can be transported together with the electrolyte out from the electrolyte space or exits into the gas space and is transported away there. In the latter case, a continuous gas flow in the gas space is necessary, with reaction gas being introduced and a mixture of reaction gas and product gas being discharged.

Operation of the electrolysis cells thus consists of feeding in the reaction gas as starting material, introducing it into the GDE and subsequently discharging the reaction gas or a product gas formed. The possible ways of influencing this process by means of the diffusion processes in the GDE and by means of pressure differences between gas side and electrolyte side of the GDE are limited. Gas can be pushed through the porous GDE by means of the pressure difference. However, undesirable effects also have to be accepted here. Depending on the pressure gradient, reaction gas can also exit from the GDE on the electrolyte side. Conversely, the electrolyte can exit from the GDE on the gas side. Since the electrolyte is usually a salt solution, there is then a risk that salts will crystallize out on the gas side of the GDE. In addition, the exiting liquid has to be removed from the gas space and possibly humidifies the reaction gas.

SUMMARY

As an example, some embodiments of the teachings herein include an electrolysis cell comprising a housing (11) with an anode (15) and a gas diffusion electrode (16) connected as cathode, which can both be brought into contact with an electrolyte in an electrolyte space formed by the housing (11), where the gas diffusion electrode (16) is arranged as separator between the electrolyte space and a gas space for a reaction gas provided in the housing (11) and the gas diffusion electrode adjoins on an electrolyte side (21) the electrolyte space and on a gas side (22) adjoins the gas space, characterized in that the gas diffusion electrode (16) adjoins on the gas side (22) a contact side (26) of a support body (25), where the gas space is formed by a first channel system (29) and by a second channel system (30), where the first channel system (29) and the second channel system (30) run separately from one another and thus form two separate volumes of the gas space and the first channel system (29) and the second channel system (30) each have openings in the contact side (26).

In some embodiments, the electrolyte space is divided by a dividing wall (12) configured as ion-permeable separation membrane or as ion- and liquid-permeable separator into an anode space (13) and a cathode space (14), where the anode space (13) has an anolyte inlet (17) and an anolyte outlet (18) for an anolyte and the cathode space has a catholyte inlet (19) and a catholyte outlet (20) for a catholyte.

In some embodiments, the first channel system (29) has first channels (27) and the second channel system (30) has second channels (28), with the first channels (27) and the second channels (28) being arranged alternately and parallel to one another and to the contact side (26) in the support body (25).

In some embodiments, the first channel system (29) and the second channel system (30) have a comb-like configuration and intermesh.

In some embodiments, the openings in the contact side (26) are formed by the first channels (26) which are open in the direction of the contact side (26) and the second channels (28) which are open in the direction of the contact side (26).

In some embodiments, the openings in the contact side (26) are formed by holes (33) which connect the first channel system (29) and the second channel system (30) in each case to the contact side (26).

In some embodiments, at least two electrolyte spaces are arranged in the housing (11).

In some embodiments, adjacent electrolyte spaces are separated from one another by a support body (25) which on both sides has a contact side (26) which is in each case adjoined by a gas diffusion electrode (16).

In some embodiments, adjacent electrolyte spaces are separated from one another by a support body (25) which on its contact side (26) is adjoined by the gas diffusion electrode (16) of one of the adjacent electrode spaces and the opposite side of which is configured as anode (15) of the other of the adjacent electrode spaces.

In some embodiments, the support body (25) consists of an electrically conductive material.

As another example, some embodiments include an electrode plate having a gas diffusion electrode (16) for installation in an electrolysis cell as described above, characterized in that the gas diffusion electrode (16) is fastened on a gas side (22) to a contact side (26) of a plate-like support body (25), where a gas space adjoining the gas side (22) is formed by a first channel system (29) and by a second channel system (30), where the first channel system (29) and the second channel system (30) run separately from one another and thus form two separate volumes of the gas space and the first channel system (29) and the second channel system (30) each have openings in the contact side (26). In some embodiments, a side of the support body (25) opposite the contact side (26) is electrically conductive and is electrically connected to the contact side (26).

In some embodiments, both sides of the support body (29) are configured as contact sides for in each case a gas diffusion electrode (25).

As another example, some embodiments include a method for operating an electrolysis cell as claimed in any of the preceding claims, where the electrolyte side (21) of the gas diffusion electrode (16) is brought into contact with an electrolyte and the gas side (22) of the gas diffusion electrode (16) is supplied with a reaction gas, characterized in that the flow direction of the reaction gas in the first channel system (29), on the gas side (22) and in the second channel system (30) is reversed at least once during the electrolysis.

BRIEF DESCRIPTION OF THE DRAWINGS

Further details of the teachings herein are described below with the aid of the drawing. Identical or corresponding elements in the drawing are in each case provided with the same reference symbols and are explained repeatedly only insofar as there are differences between the individual figures. In the figures.

DETAILED DESCRIPTION

The teachings of the present disclosure describe an electrolysis cell having a gas diffusion electrode, an electrode plate which can be used in this electrolysis cell, and a method for the operation thereof, by means of which the gas throughput of reaction gas in the GDE can be set very flexibly and undesirable throughput of electrolyte and/or reaction gas through the GDE is very largely avoided.

Some embodiments include an electrolysis cell with a gas diffusion electrode (GDE) adjoining on the gas side a contact side of a support body, with the gas space being formed by a first channel system and by a second channel system. Here, the first channel system and the second channel system run separately from one another, i.e. the reaction gas cannot switch directly between the first channel system and the second channel system. Rather, the first channel system and the second channel system each have openings in the contact side which directly adjoin the gas side of the GDE. In this way, the reaction gas advantageously flows through the GDE in order to switch between the first channel system and the second channel system.

Flow of the reaction gas through the GDE is forced as a result, with this flow running laterally along the gas side of the GDE. This gives additional possible ways of controlling the gas flow in the GDE. As a result of the first channel system and the second channel system being separated from one another, it is possible to set a different pressure in the two channel systems. This gives a controllable pressure gradient which directly influences the flow of the reaction gas in the GDE. An increase in the pressure difference here primarily leads to an increase in the reaction gas flow laterally to the gas side of the GDE and only indirectly to an increase in the flow of the reaction gas orthogonally to the gas side. It is therefore easier to avoid or at least reduce passage of the reaction gas through to the electrolyte space even in the case of high pressure differences between the first channel system and the second channel system. The pressure difference can also be altered during operation of the electrolysis cell.

On the other hand, the pressure gradient between gas side and electrolyte side of the GDE can be set independently of the pressure gradient prevailing between the first channel system and the second channel system in order to influence firstly the orthogonal component of the flow of the reaction gas and the flow of the electrolyte orthogonally to the electrolyte side in the direction of the gas space. Passage of electrolyte at the GDE can thus be prevented or at least reduced without significantly influencing the throughput rate of the reaction gas. Of course, further influencing factors can also be varied. The thickness of the GDE, the layer structure and the porosity thereof can, for example, likewise be altered in order to influence the flow conditions in the GDE.

In some embodiments, the support body contributes to the mechanical and electrical contacting of the GDE. This makes it possible to produce large-area GDEs because these can both be reliably electrically contacted and be mechanically stabilized by means of the support body. The mechanical stabilization in turn allows greater pressure gradients between gas side and electrolyte side of the GDE, which in turn may increase the latitude in the setting of the process parameters.

In some embodiments, the reaction gas can be conveyed from the first channel system via the openings into the GDE and out from the GDE through the openings into the second channel system. However, the reverse direction is also conceivable. In addition, in accordance with the above-described method, the flow direction of the reaction gas in the first channel system on the gas side and in the second channel system may be reversed at least once during the electrolysis. Thus, the first channel system and the second channel system can each be used both for introduction of the reaction gas and for discharge of the reaction gas and any product gas formed. Reversal of the flow direction during the electrolysis has the advantage that any performance decreases in the GDE which occur by establishment of a steady state in the GDE can be compensated for.

The setting of the respective pressure gradients between the first channel system and the second channel system and between the electrolyte side and the gas side of the GDE can also be utilized for controlling the path of a product gas which is formed in the GDE. As a result of the product gas having different properties than the reaction gas (which is fed in as feed gas), it is possible for the product gas to pass through the GDE and leave the electrolysis cell by the electrolyte space or for the product gas to be largely discharged via the first channel system or the second channel system. This event can also be influenced directly by setting of the pressure ratios between the first channel system and the second channel system and also between electrolyte side and gas side of the GDE.

In some embodiments, the electrode plate includes a gas diffusion electrode fastened on a gas side to a contact side of a plate-like support body, with a gas space adjoining the gas side being formed by a first channel system and by a second channel system. The first channel system and the second channel system run, as described above, separately from one another. In addition, the first channel system and the second channel system each have openings in the contact side which is adjoined by the GDE. Such an electrode plate is suitable for installation in the above-described electrolysis cell, as a result of which the advantages described above are achieved.

In some embodiments, a side of the support body located opposite the contact side is electrically conductive and is electrically connected to the contact side. In this way, the electrode plate can be used as bipolar plate, as a result of which a particularly simple construction of the electrolysis cell in a stack configuration is made possible. Here, electrolyte spaces may be arranged alternately with the gas spaces formed by the first channel system and the second channel system, with the gas space being integrated into the electrode plate. Between the electrode plates there are thus the electrode spaces, e.g. separated by a separating membrane into an anode space and a cathode space. The electrode plate serves, in each case together with the GDE joined to its one side, as cathode and in an adjacent electrolyte space with its opposite side as anode. The contact side of the support body at the same time serves for electrical contacting of the GDE. In some embodiments, both sides of the support body to be configured as contact sides for a GDE in each case. This means that the first channel system and the second channel system also have to have openings in the two contact sides. In this way, the electrode plate can serve to make a GDE available as cathode for each of two adjacent electrode spaces.

In some embodiments, the electrode plate can be configured as described above, with the abovementioned advantages being achieved. In some embodiments, the first channel system may have first channels and the second channel system may have second channels, with the first channels and the second channels being arranged alternately and parallel to one another and parallel to the contact side in the support body. In some embodiments, the first channel system and the second channel system have a comb-like structure and intermesh with one another. In some embodiments, openings in the contact side may be formed by the first channels which are open in the direction of the contact side and the second channels which are open in the direction of the contact side. In some embodiments, the openings in the contact side may be configured as holes which connect the first channel system and the second channel system respectively to the contact side.

In some embodiments, the electrolyte space is separated by a dividing wall separately configured as ion-permeable separating membrane or as ion- and liquid-permeable separating membrane into an anode space and a cathode space, with the anode space having an anolyte inlet and an anolyte outlet for an anolyte and the cathode space having a catholyte inlet and a catholyte outlet for a catholyte. Such a configuration of the electrolyte space may be used when different gases which should not mix with one another in the electrolyte space are formed at the anode and the cathode (GDE) or pass through the GDE. The dividing wall is of particular importance when an electrolysis of water is carried out in the electrolyte space and the gases oxygen and hydrogen formed should not mix to form an explosive $H_2/O_2$ gas mixture.

In some embodiments, the first channel system has first channels and the second channel system has second channels, with the first channels and the second channels being arranged alternately and parallel to one another and parallel to the contact side in the support body. The parallel arrangement relative to one another advantageously results in the distances between the first channels and the second channels each remaining constant and being able to be designed according to the criterion that a required path length of the gas is covered in the GDE. In this case, the reaction gas flows in each case from the channels used as inlet to the channels used as outlet. A parallel orientation of the channels relative to the contact side may further assist the uniformed distribution of the reaction gas over the entire GDE whose surface rests against the support body via the contact side of the latter.

In some embodiments, the support body supports the GDE in addition to the task of accommodating the channels and distributing the reaction gas. The GDE can therefore be made thinner or with a greater porosity and thus greater internal surface area for reaction of the reaction gas. The efficiency of the GDE may be increased, while the mechanical stability of the GDE is ensured by the support body. The regions of the contact side which are not provided with the openings and thus rest directly against the gas side of the GDE are sufficient for this purpose.

When the support body is made of an electrically conductive material, it can also perform electrical contacting and not only mechanical contacting of the GDE. Particularly in the case of large-area GDEs, which are intended for industrial use, electrical contacting of the GDE having a low transition resistance can be achieved in this way. The support body is also suitable, in particular, to support a stack structure of the electrolysis cell (more on this subject below).

In some embodiments, the first channel system and the second channel system have a comb-like configuration and intermesh. The course of the channels here corresponds to the teeth of the comb which are in each case supplied via a common distributed channel. The distances between the respectively adjacent channels of one comb-like arrangement are so large that the respective adjacent channels of the other comb-like arrangement find room in the intermediate spaces. The spacing of the first channels and second channels is in each case so great that the reaction gas covers a sufficient path length in the adjacent GDE. The advantage of a comb-like configuration of the channel system is a hydrodynamically advantageous structure in which the individual first channels and second channels can be supplied uniformly with the reaction gas. This can be additionally assisted by a cross section which tapers toward the ends of the respective first channels and second channels.

In some embodiments, the openings in the contact side may be formed by the first channels which are open in the direction of the contact side and the second channels which are open in the direction of the contact side. In other words, the channels in the contact side are configured as grooves or valleys so that, in other words, the missing wall of the channels forms the opening in the contact side. The opening then has a sufficiently large cross-sectional area for the reaction gas to be able to switch between the respective channels and the GDE with a low flow resistance. The remaining contact side between the channels serves for supporting of the GDE by the support body in this embodiment.

In some embodiments, the openings in the contact side may be formed by holes which connect the first channel system and the second channel system to the contact side. In other words, the first channels and the second channels are configured in such a way that they run in the interior of the support body, with the holes creating connections through which the reaction gas can flow out from the channels into the GDE and out from the GDE back into the channels. In this embodiment, a comparatively large proportion of the area of the contact side may be available for supporting of the GDE by the support body.

In some embodiments, at least two electrolyte spaces are arranged in the housing. Far more than two electrolyte spaces can also be provided, for example ten electrolyte spaces, twenty electrolyte spaces, or fifty electrolyte spaces. A stack construction is a construction in which the electrolyte spaces are arranged alternately with the electrodes (i.e. the anode and the GDE configured as cathode) and the gas spaces, with, in particular in the case of industrial applications, sufficient electrode area being able to be made available in a comparatively tight construction space. The configuration of the electrolysis cell in a stacked manner can be configured differently, as will be explained further below.

In some embodiments, adjacent electrolyte spaces are separated from one another by a support body which on both sides has a contact side which is adjoined in each case by a gas diffusion electrode. This means that a GDE has to be arranged on both sides of the support body, with the first channel system and the second channel system in the support body supplying both GDEs with the reaction gas. The two adjacent electrode spaces may then each have a plate-like anode, which likewise adjoins a cathode space on each side, on the opposite sides of the GDE. In the stacking order, there are thus in each case a cathode space, a GDE-support body composite, a cathode space, an anode, a cathode space, a GDE-support body composite, etc. In some embodiments, the pressure of the reaction gas can be applied symmetrically to the support bodies and the number of support bodies used can be reduced.

In some embodiments, adjacent electrolyte spaces are separated from one another by a support body, the contact side of which is adjoined by the gas diffusion electrode of the one of the neighboring electrode spaces and the opposite side of which is configured as anode of the other neighboring electrode spaces. This forms a bipolar plate which on one side has a surface serving as anode for an electrolyte space and on the other side is provided with the channel system and the GDE for a neighboring electrolyte space. In this stack construction, the electrolyte spaces alternate with the cathode-anode unit (having the support body with the gas space and the GDE), as a result of which a particularly simple construction may be obtained. In particular, the electrical contacting is simplified since the bipolar plates can be connected electrically in series, so that an electrical connection to a voltage source has to be provided only at the outermost anode and the outermost cathode formed by a support plate and a GDE. For this purpose, the support bodies have to be electrically conductive.

Figure 1:
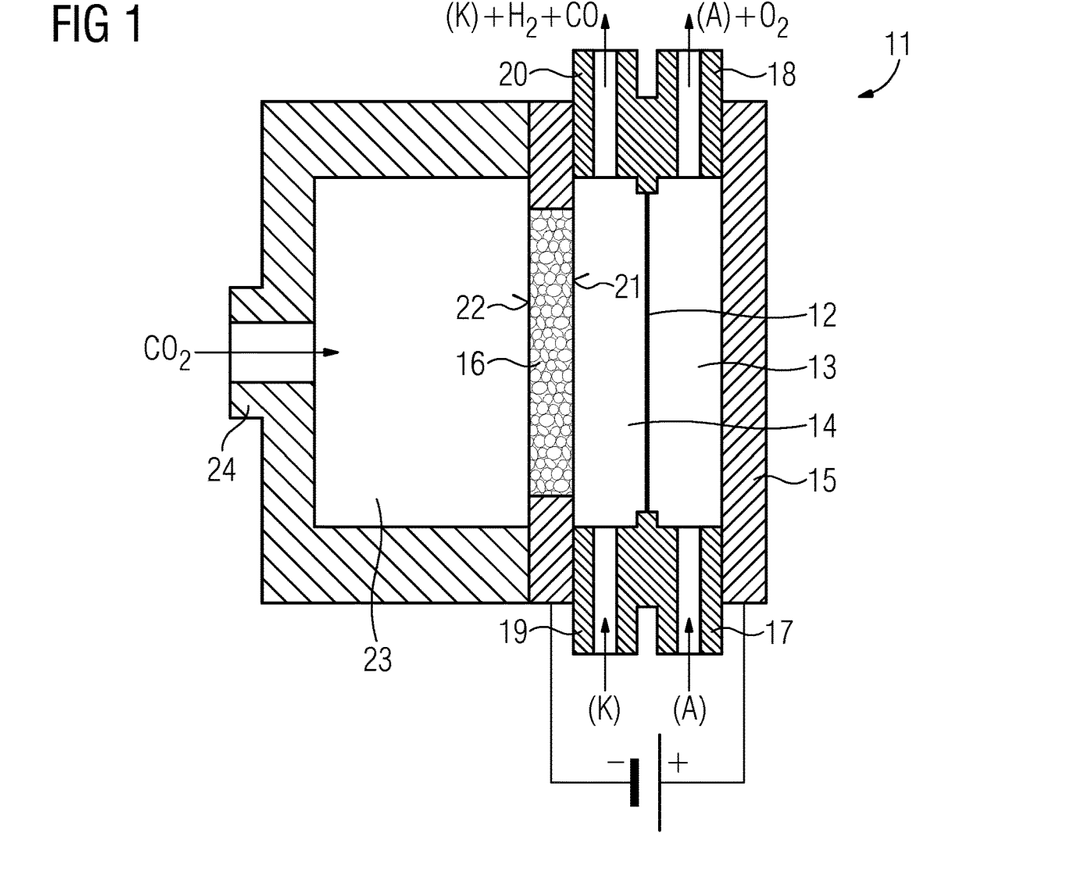
FIG. 1 illustrates an electrolysis cell having a structure according to the prior art.

FIG. 1 depicts an electrolysis cell according to the prior art. An electrolyte space which is divided by a gas-impermeable dividing wall 12 into an anode space 13 and a cathode space 14 is provided in a housing 11. The electrolyte space is thus formed jointly by the anode space 13 and the cathode space 14. The anode space 13 is also delimited by an anode 15 and the cathode space 14 by a gas diffusion electrode (GDE) 16 connected as cathode. In order to be able to pass an anolyte (A) through the anode space, an anolyte inlet 17 and an anolyte outlet 18 are provided. Likewise, the catholyte space 14 has a catholyte inlet 19 and a catholyte outlet 20 in order to make it possible for a catholyte (K) to be passed through.

The GDE 16 adjoins on an electrolyte side 21 the catholyte space 14. On a gas side 22 opposite the electrolyte side 21, the GDE 16 adjoins a gas space 23 which is likewise accommodated in the housing 11. This gas space 23 has a gas inlet 24 for a reaction gas which can diffuse into the GDE 16 owing to the porosity of the latter (indicated in FIG. 1).

Figure 2:
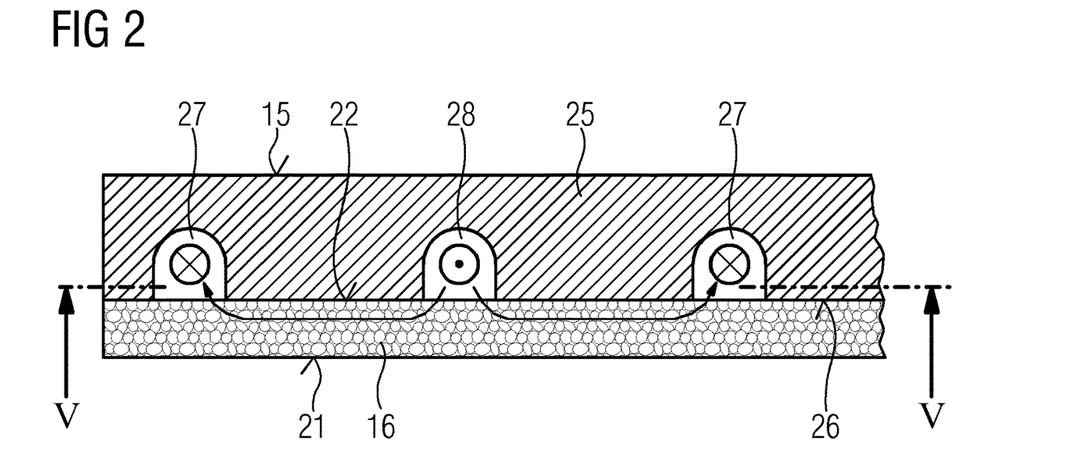
FIG. 2 illustrates a composite of support body and GDE, as can be used in a working example according to the prior art.
Figure 5:
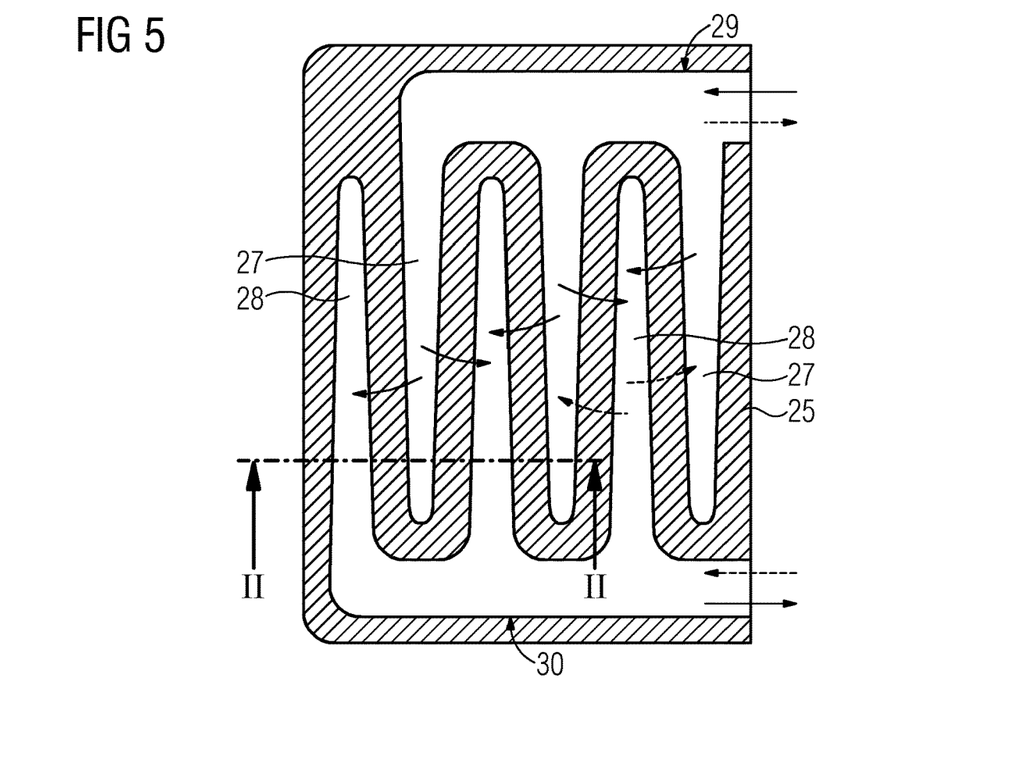

The arrangement of the GDE 16 on a support body 25 can be seen in FIG. 2. This support body is shown in the section II-II in FIG. 5, where FIG. 5 is depicted in the section V-V (drawn in in FIG. 2). The support body 25 has a contact side 26 against which the gas side 22 of the GDE 16 rests. In addition, first channels 27 and second channels 28 are provided in the contact side 26. The first channels 27 and second channels 28 differ in that the first channels belong to a first channel system 29 and the second channels belong to a second channel system 30 (cf. FIG. 5), where the first channel system runs fluidically separately from the second channel system. The gas space is thus divided into two separate volumes.

As can be seen from FIG. 5, the first channel system can, as indicated by the arrows with solid lines, be utilized for feeding in the reaction gas and the second channel system 30 can be used for discharging reaction gas which has not been consumed during the reaction. During the reaction, the reaction gas switches from the first channel system to the second channel system on passage through the pores in the GDE 16, which is likewise indicated by the arrows. These arrows thus indicate passage through the GDE 16, with the GDE not being shown in FIG. 5. During passage through the GDE 16, the reaction gas is at least partially converted in a reaction (cf. also the arrows in FIG. 2). The broken-line arrows in FIG. 5 indicate that the flow direction in the support body can also be reversed, as a result of which the flow through the GDE 16 also occurs in the reverse direction.

The unit shown in FIG. 2 forms an electrode plate which can be installed in the housing of an electrolysis cell. Such an installation example can be seen in FIG. 3. Here, the electrode plate as shown in FIG. 2 forms a bipolar plate, i.e. the side of the support body 25 opposite the contact side 26 is configured as anode 15. If the electrode plate as shown in FIG. 2 is installed in an electrolysis cell having a stack construction, the anode 15 and the cathode formed by the GDE 16 are in each case used in adjacent electrolyte spaces (cf. also FIG. 3).

Figure 3:
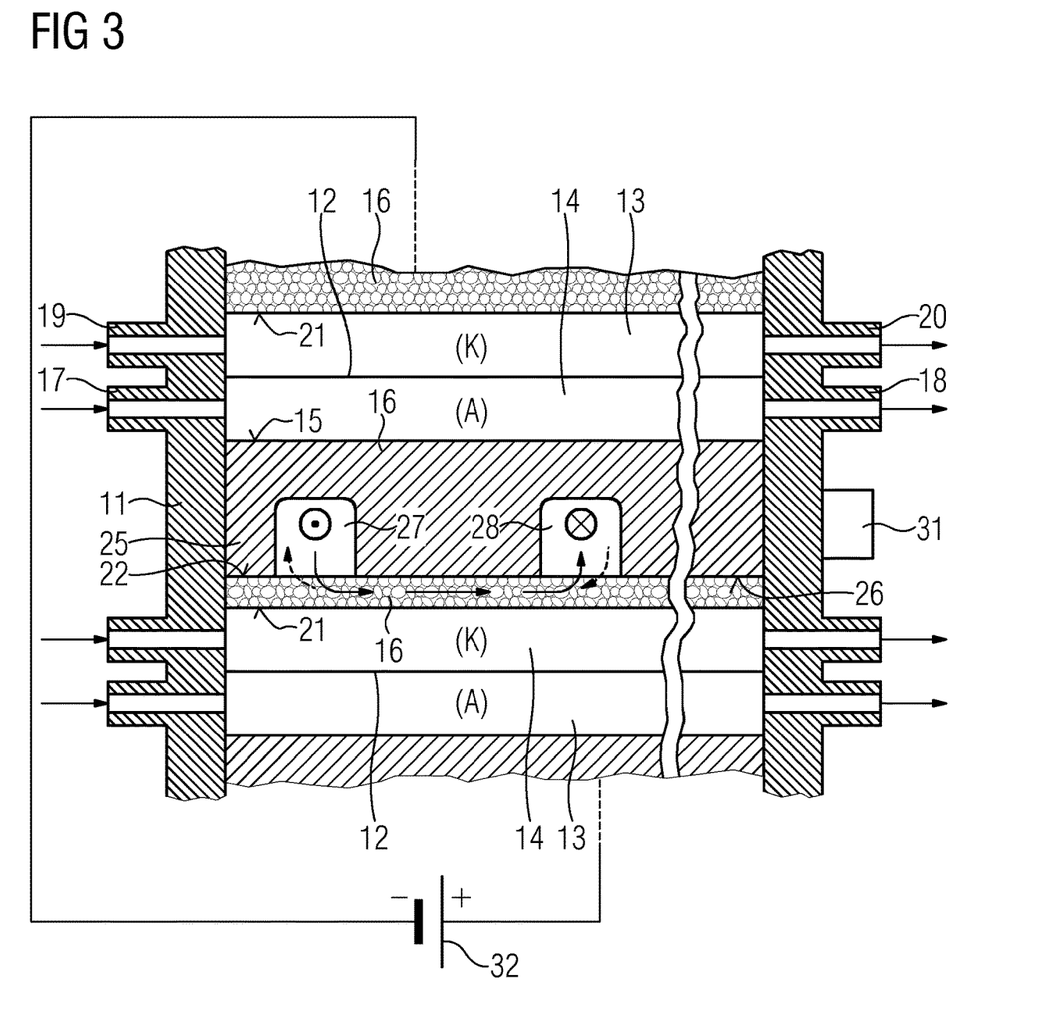
FIGS. 3 and 4 illustrate working examples of an example electrolysis cell incorporating teachings of the present disclosure, shown in section, where a working example of a corresponding process proceeds as shown in FIG. 3, and FIGS. 5 and 6 illustrate working examples of support bodies in section with different courses of the first channels and second channels, as can be used in the electrolysis cell incorporating the teachings herein.
Figure 4:
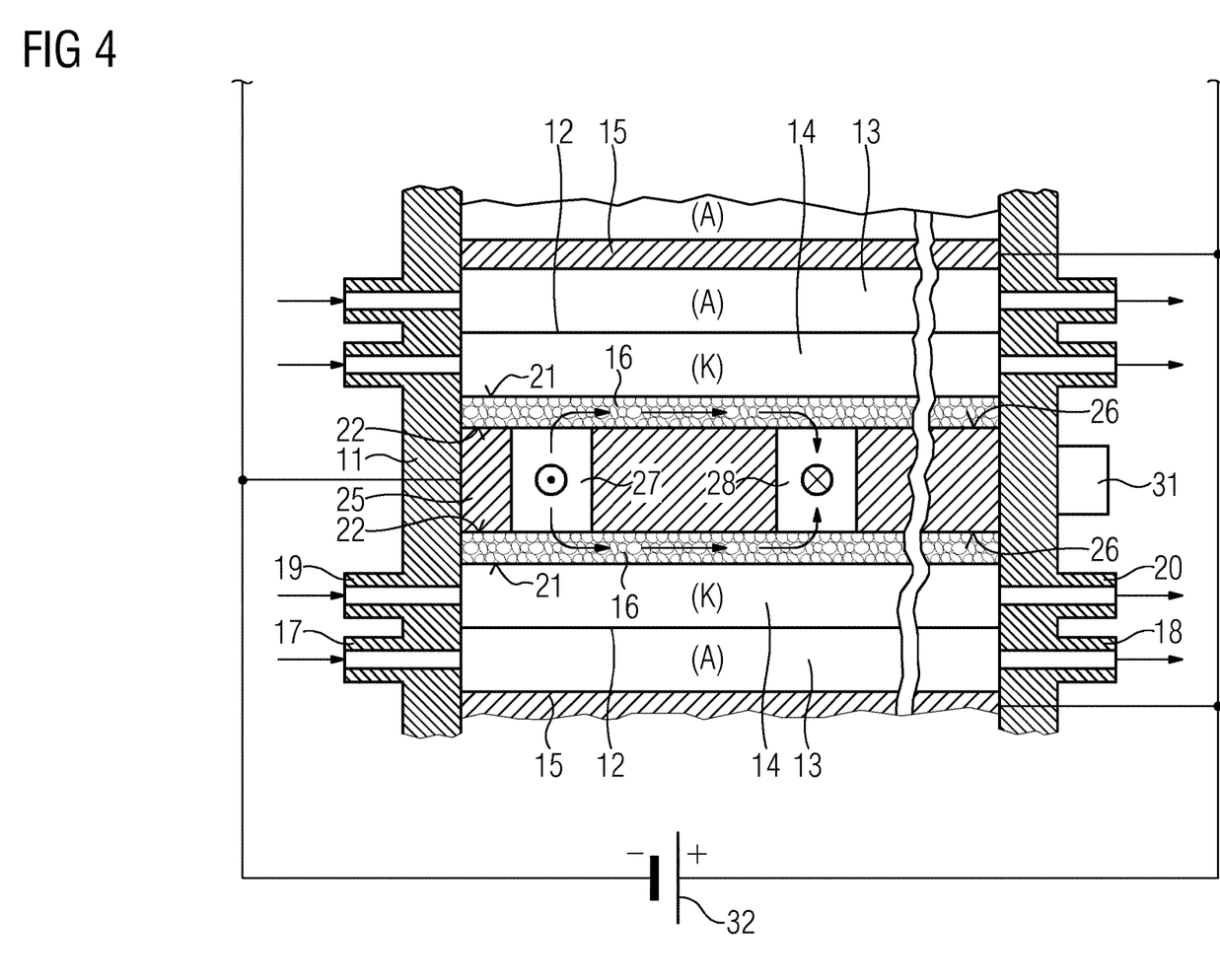

Different construction principles are fundamentally possible for the electrolysis cell and these are depicted by way of example in FIG. 3 and in FIG. 4. Both arrangements show a possible stacked construction of the electrolysis cell.

In FIG. 3, electrode plates having a structure as shown in FIG. 2 are used. The following stacking order is realized in the electrolysis cell. The support body 25 is followed on the side employed as anode 15 by an anode space 13 which is separated by a dividing wall 12 from a subsequent cathode space 14. A GDE 16, which is supported by a subsequent support body 25, adjoins the cathode space 14. First channels 27 and second channels 28 are also present in the support body 25. The stacking order is then repeated.

Anolyte inlets 17 and anolyte outlets 18 are provided for each of the anode spaces 13 and the catholyte inlets 19 and catholyte outlets 20 are provided for the cathode spaces. In addition, a connection port 31 which is connected in a manner not shown in more detail to the first channels 27 can be seen. In the case of the flow direction depicted in FIG. 3, the connection port is used as gas inlet, while in the case of the reverse flow direction indicated by broken-line arrows it is used as gas outlet for the reaction gas with which the GDE is supplied. A comparable connection port for the second channels 28 is located in front of the drawing plane depicted in FIG. 3 and is therefore not shown.

Furthermore, the electrical contacting of the electrolysis cell is indicated in FIG. 3. The design of the composite of support body 25 and GDE 16 as bipolar plate in each case makes it possible for the electrolysis cells consisting of the respective anode spaces 13 and the cathode spaces 14 to be connected in series. Only the outermost anode of the stack in each case is connected to the plus pole of a voltage source and the outermost GDE is connected via the outermost support body to the minus pole of the voltage source 32.

A similar structure as in FIG. 3 is described in FIG. 4, and only the differences will be explained below. The support body 25 has two contact sides 26 located opposite one another, on each of which a GDE 16 is arranged. This gives the following stacking order for the stacked construction. An electrode plate is provided as anode 15 which is adjoined by an anolyte space 13. This is separated by a dividing wall 12 from a catholyte space 14. This is followed by a GDE 16 which is arranged on a support body 25. On the other side of the support body 25, there is a further GDE 16. This is followed by a further cathode space 14, a further dividing wall 12 and a further anode space 13. Subsequently, the stacking order recommences with a further anode 15.

In this arrangement of the electrolysis cells consisting of anode space 13 and cathode space 14, the electrolysis cells are connected in parallel. An electrical connection of all anodes 15 and all GDEs 16, in each case via the support bodies 25, is therefore necessary in each case. This is indicated in FIG. 4. As can be seen, the plus pole of the voltage source 32 is electrically connected to the anodes 15 and the minus pole of the voltage source is electrically connected to the electrically conductive support bodies 25.

The first channels 27 and second channels 28 are in the case of the support body 25 shown in FIG. 4 configured so that they open in the direction of both sides of the support body. The first channels 27 and second channels 28 thus simultaneously supply both opposite GDEs 16 with the reaction gas. The fluidic connections (17, 18, 19, 20, 31) of the electrolysis cell are no different from the structure shown in FIG. 3 and are therefore not explained in more detail in connection with FIG. 4.

A possible course of the first channel system 29 and of the second channel system 30 can be seen from FIG. 5. Both channel systems have a comb-like course, which means that the first channels 27 and the second channels 28 form the teeth of this comb-like arrangement. These in each case run alternately parallel to one another, which is achieved by the comb-like structures intermeshing. In addition, the first channels 27 and the second channels 28 are also arranged parallel to the drawing plane depicted, so that they also run parallel to the contact side 26 located above the same plane (cf. FIG. 2).

As a result of the parallel course of the first channels 27 and second channels 28, there is, as can be seen from FIG. 2, a constant path length which has to be covered in the GDE 16 by the reaction gas conveyed through said channels in order to switch from the first channel system 29 into the second channel system 30 (or vice versa). The GDE is in this way uniformly supplied with reaction gas, with the gas flow occurring primarily parallel to the gas side 22 of the GDE 16. Exit of the reaction gas from the electrolyte side 21 of the GDE 16 can in this way be prevented more easily.

As can also be seen from FIG. 5, the first channel system 29 and the second channel system 30 has a cross-sectional profile which narrows continually in the direction of the dead ends of the first channels 27 and second channels 28. In this way, a uniform pressure distribution for the reaction gas in said channel system can be ensured, such that the local pressure drop between the openings of the first channels 27 and second channels 28 over the area of the GDE 16 can be kept constant.

Figure 6:
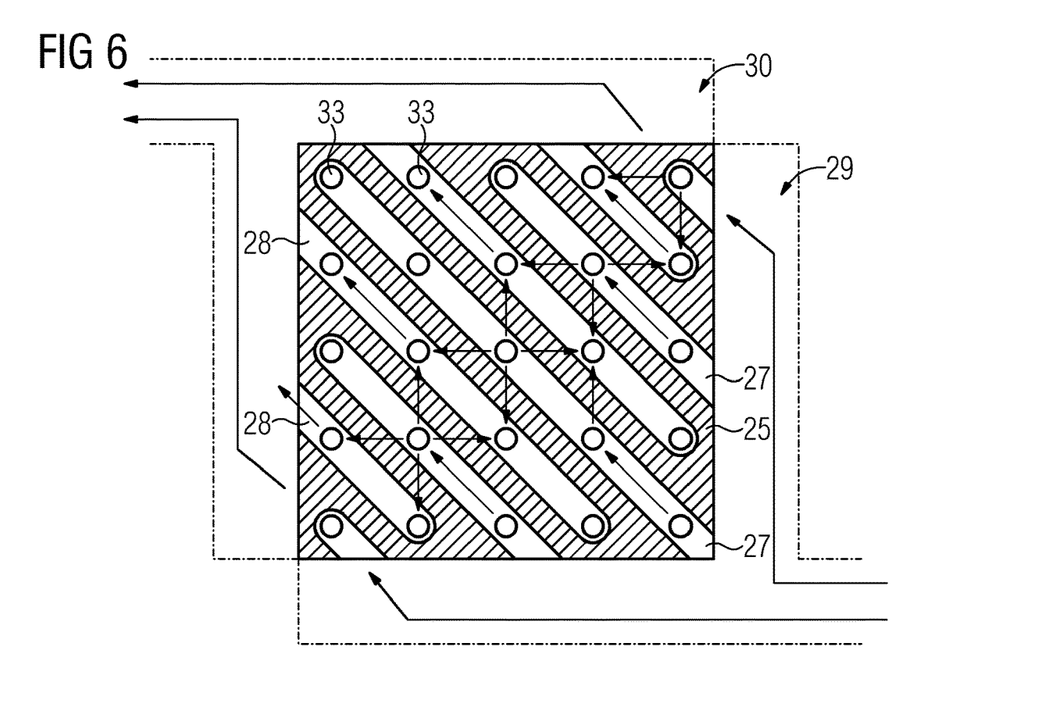

FIG. 6 depicts an alternative embodiment of the support body 25, in which the openings in the contact side are formed by holes 33. The holes can, for example, be drilled holes which connect the first channels 27 and second channels 28 in each case to the contact side of the support body 25 located behind the drawing plane in FIG. 6. In the working example as shown in FIG. 6, the first channels 27 and second channels 28 run diagonally in the depicted square sectional area of the support body 25. The holes 33 are arranged on a square grid in the support body 25, so that adjacent holes are also in each case connected alternately to one of the first channels 27 or one of the second channels 28. This results, as indicated by the vertical and horizontal arrows shown in FIG. 6, in each case in short paths for the reaction gas in the GDE located behind the drawing plane, in each case from one of the holes 33 to the four vertically and horizontally adjacent holes 33.

To connect the first channels 27 and the second channels 28 to a first channel system 29 and a second channel system 30, respectively, said channel systems are continued and combined in the housing which surrounds the support body and is not shown in detail. The course of the first channel system 29 and the second channel system 30 is indicated by dot-dashed lines at the periphery of the support body.

An example of the use of the electrolysis cell will be described for the example of FIG. 1 and can equally well be carried out using the electrolysis cells configured as shown in FIGS. 2-6. Carbon dioxide is used as reaction gas and is converted into carbon monoxide in the GDE 16. In some embodiments, the carbon monoxide passes through the GDE on the electrolyte side 21 and is transported away with the catholyte (K) passed through. Due to an electrochemical dissociation of water, hydrogen is additionally formed in the cathode space 14 and is discharged together with the carbon monoxide. Oxygen is formed in the anode space 13. The dividing wall 12 prevents the hydrogen gas from mixing with the oxygen gas.

In the case of the electrolysis cells as shown in FIGS. 2-6, the carbon dioxide is, as a difference from the apparatus shown in FIG. 1, fed in via one of the two channel systems (first channel system 29, second channel system 30) and unreacted carbon dioxide gas is discharged again through the other of the two channel systems (29, 30). This makes it possible to set the pressure difference between the two channel systems mentioned and utilize it as control parameter for the throughput of carbon dioxide in the GDE 16. The carbon dioxide gas discharged can also contain carbon monoxide gas which has not passed through to the electrolyte side 21 of the GDE 16.

What is claimed is:
1. An electrolysis cell comprising:
   a housing with an anode and a gas diffusion electrode connected as cathode, wherein both the anode and the cathode are brought into contact with at least one electrolyte in an electrolyte space;

the gas diffusion electrode having an electrolyte side and a gas side, the gas diffusion electrode separating the electrolyte space from a gas space for a reaction gas; a support body disposed in the gas space with a contact surface in contact with the gas side of the gas diffusion electrode;

wherein the gas space comprises a first channel system and a second channel system;

wherein the first channel system and the second channel system run separately from one another and thus form two separate volumes of the gas space;

wherein a pressure in the first channel system is set to a first value and a pressure in the second channel system is set to a second value, and the first value and the second value are set different from one another to control a pressure gradient across the gas diffusion electrode; and the first channel system and the second channel system each have openings in the contact surface of the support body.

2. The electrolysis cell as claimed in claim 1, further comprising a dividing wall disposed in the electrolyte space;

wherein the at least one electrolyte includes an anolyte and a catholyte;

the dividing wall comprises an ion-permeable separation membrane separating the electrolyte space into an anode space and a cathode space;

the anode space has an anolyte inlet and an anolyte outlet for the anolyte; and the cathode space has a catholyte inlet and a catholyte outlet for the catholyte.

3. The electrolysis cell as claimed in claim 1, wherein:
the first channel system comprises first channels;
the second channel system comprises second channels; and
the first channels and the second channels are arranged alternately and parallel to one another and to the contact surface of the support body.

4. The electrolysis cell as claimed in claim 3, wherein the first channel system and the second channel system each have a comb-like configuration and intermesh with one another.

5. The electrolysis cell as claimed in claim 3, wherein the openings in the contact surface of the support body are formed by the first channels and the second channels.

6. The electrolysis cell as claimed in claim 3, wherein the openings in the contact surface comprise holes connecting the first channel system and the second channel system respectively to the contact surface.

7. The electrolysis cell as claimed in claim 1, further comprising a second electrolyte space in the housing.

8. The electrolysis cell as claimed in claim 7, wherein the electrolyte space and the second electrolyte space are separated from one another by the support body, the support body is adjoined by the gas diffusion electrode.

9. The electrolysis cell as claimed in claim 7, wherein the electrolyte space and the second electrolyte space are separated from one another by the support body, the support body serving as an anode for a third electrode space, the third electrode space adjoined by a fourth electrode space and a second gas diffusion electrode.

10. The electrolysis cell as claimed in claim 1, wherein the support body comprises an electrically conductive material.

* * * * *